UNITED STATES PATENT OFFICE.

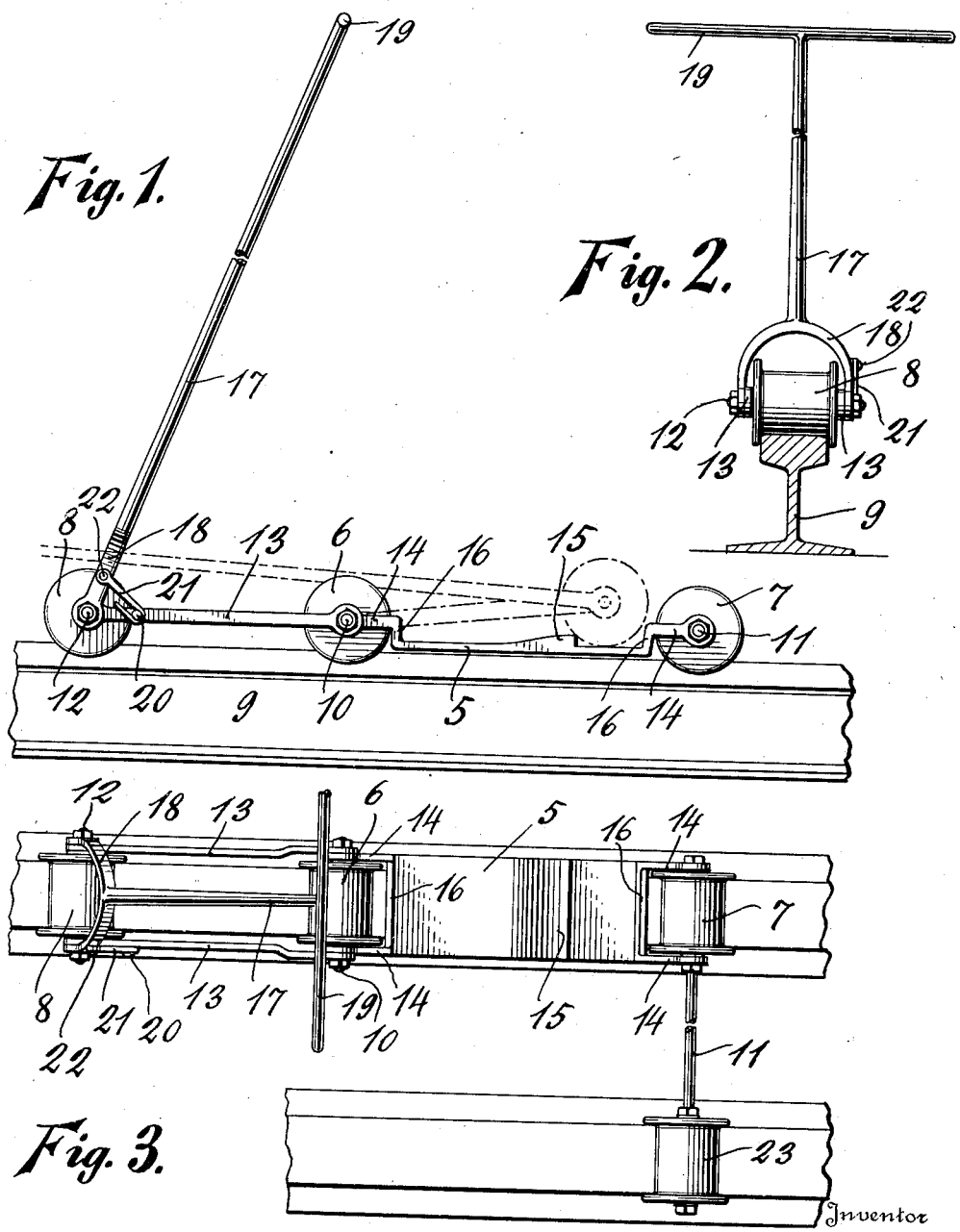

WILLIAM O'DAY, OF CHICAGO, ILLINOIS.

VELOCIPEDE.

1,100,322.     Specification of Letters Patent.     Patented June 16, 1914.

Application filed December 8, 1913. Serial No. 805,309.

*To all whom it may concern:*

Be it known that I, WILLIAM O'DAY, a citizen of the United States, residing at Chicago, in the county of Cook and State of Illinois, have invented certain new and useful Improvements in Velocipedes, of which the following is a specification.

This invention relates to velocipedes characterized by a wheeled frame on which the rider stands with one foot, leaving the other foot free for propulsion by pushing therewith against the ground or other surface.

The present device is designed more particularly for use on a railway track to facilitate the travel of flagmen, section hands and other railway employees.

The invention has for its object to provide a simple, strong and durable device of the kind stated, and one which affords a firm and secure foothold for the user.

The invention also has for its object to provide a structure which permits the device to be folded when not in use.

Other objects and advantages of the invention will be pointed out in the detailed description appearing hereinafter, and in order that the invention may be better understood, reference is had to the accompanying drawing, in which—
Figure 1 is a side elevation of the device; Fig. 2 is a front elevation thereof, and Fig. 3 is a plan view showing a modification.

Referring specifically to the drawing, the device comprises a foot rest 5 supported at its front and rear ends on wheels 6 and 7, respectively, the structure being similar to a roller skate. A third wheel 8 is also provided, the same being located in front of the wheel 6. The wheels are flanged at both ends, as shown in Fig. 2, in order that they may retain their position on the rail 9 of the track.

As hereinbefore stated, the device is designed more particularly for use by railway employees, it being mounted on the rail as shown and propelled by pushing with one foot against the road bed or other surface, the other foot being placed on the foot rest 5 and supporting the person on the device.

The wheels 6 and 7 are loosely mounted on axles 10 and 11, respectively, and the wheel 8 is loosely mounted on an axle 12 carried by side bars 13 which are spaced laterally to accommodate said wheel. The side bars 13 are pivotally connected at their rear ends to the axle 10, so that said bars and the wheel 8 may be swung over on top of the foot rest 5, as shown by dotted lines in Fig. 1. The device may thus be folded when not in use, for convenience in storage and transportation.

The foot rest 5 is a metal plate having forked front and rear ends 14 which straddle the wheels 6 and 7, and are made fast to the ends of the axles 10 and 11 thereof. The intermediate portion of the foot rest is dropped so that it lies below the plane of the axles, and it has a transverse upstanding rib 15 to serve as an abutment for the heel of the rider's shoe to come against. The forked ends of the foot rest rise at the front, behind the wheel 6, and at the rear, in front of the rear wheel 7, as indicated at 16, and thus serve to prevent the rider's foot coming in contact with said wheels. The drop in the foot rest affords a low position for the rider, which enables him to easily maintain his balance.

To the axle 12 is pivotally connected an upright handle bar 17, the lower part of which is forked, as indicated at 18, to straddle the wheel 8, and the upper end of the bar has hand grips 19.

To hold the handle bar in upright position and prevent the same from dropping away from the rider's hands, one of the side bars 13 carries a stud 20 which is engageable by a hook 21 pivoted at 22 to the forked end 18. When this hook is disengaged from the stud, the side bars 13 carrying the wheel 8 may be folded over the foot rest 5, as hereinbefore described. The stud 20 is positioned so that when it is engaged by the hook 21, the handle bar 17 slants rearward, whereby a better leverage is afforded for propulsion, as the rider may throw himself against the handle bar while pushing back with the free foot.

The front wheel 8 and the side bars 13 will be steadied by the thrust of the rider's body, and as the rider stands on a rigid support, an obstacle encountered by the wheel 8 will throw the same upward without affecting that portion of the device on which the rider stands.

Fig. 3 shows a slight modification, a third wheel 23, connected to the extended rear axle 11 being provided for travel on the other rail to steady the device.

I claim:

1. A velocipede comprising a foot rest, wheels supporting the front and rear ends of the foot rest, and a pivotally mounted wheel carried by the foot rest in advance of the front supporting wheel thereof.

2. A velocipede comprising a foot rest, wheels supporting the front and rear ends of the foot rest, a pivotally mounted wheel carried by the foot rest in advance of the front supporting wheel thereof, and a handle bar connected to the axle of the last-mentioned wheel.

3. A velocipede comprising a foot rest, front and rear wheels supporting said foot rest, a pivoted frame extending forward from the foot rest, a wheel carried by the forward end of the frame, a stud on the frame, a pivoted handle bar carried by the frame, and a hook carried by the handle bar and engageable with the stud for holding the handle bar in upright position.

4. A velocipede comprising a foot rest, wheels supporting the front and rear ends of the foot rest, and a pivotally mounted wheel carried by the foot rest in advance of the front supporting wheel thereof and foldable rearward above the foot rest, and a handle bar connected to the axle of the last-mentioned wheel.

In testimony whereof I affix my signature in presence of two witnesses.

WILLIAM O'DAY.

Witnesses:
S. J. Lehrer,
H. G. Batchelor.

Copies of this patent may be obtained for five cents each, by addressing the "Commissioner of Patents, Washington, D. C."